United States Patent
Yuan et al.

(10) Patent No.: US 8,571,189 B2
(45) Date of Patent: Oct. 29, 2013

(54) EFFICIENT TRANSMISSION OF AUDIO AND NON-AUDIO PORTIONS OF A COMMUNICATION SESSION FOR PHONES

(75) Inventors: Zheng Yuan, San Jose, CA (US); Tejas Bhandarkar, Sunnyvale, CA (US); Yongjian Tian, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 864 days.

(21) Appl. No.: 12/683,079

(22) Filed: Jan. 6, 2010

(65) Prior Publication Data
US 2011/0164735 A1 Jul. 7, 2011

(51) Int. Cl.
  *H04M 11/00* (2006.01)
  *H04M 3/42* (2006.01)
  *H04N 7/14* (2006.01)

(52) U.S. Cl.
  USPC .................. 379/93.08; 379/93.07; 379/93.09; 379/93.11; 455/445; 455/552.1; 455/553.1; 348/14.01; 348/14.09

(58) Field of Classification Search
  CPC ....... H04W 74/00; H04M 1/00; H04M 11/00; H04N 7/14
  USPC ................. 455/552.1, 553.1, 445; 348/14.01, 348/14.09; 379/93.07, 93.08, 93.09, 93.11
  See application file for complete search history.

(56) References Cited

U.S. PATENT DOCUMENTS

| | | | |
|---|---|---|---|
| 5,297,146 A | 3/1994 | Ogawa | |
| 5,898,761 A | 4/1999 | McHale et al. | |
| 6,011,851 A | 1/2000 | Connor et al. | |
| 6,298,055 B1 | 10/2001 | Wildfeuer | |
| 6,856,682 B1 | 2/2005 | Ham | |
| 6,876,734 B1 | 4/2005 | Summers et al. | |
| 6,922,568 B1 | 7/2005 | Nakamura | |
| 6,973,074 B1 | 12/2005 | Maranhao | |
| 6,973,184 B1 | 12/2005 | Shaffer et al. | |
| 6,978,001 B1 | 12/2005 | Shaffer et al. | |
| 7,075,919 B1 | 7/2006 | Wendt et al. | |
| 7,133,510 B1 | 11/2006 | Freeman et al. | |
| 7,194,084 B2 | 3/2007 | Shaffer et al. | |

(Continued)

FOREIGN PATENT DOCUMENTS

| | | |
|---|---|---|
| EP | 1921855 | 5/2008 |
| WO | 03056859 | 7/2003 |

OTHER PUBLICATIONS

Apple, Inc., Apple Push Notification Service Programming Guide, Internet Citation: http://markmail.org/download.xgy?id=hsk5hjvtkrixm23c&number=1, printed Jan. 2011, 38 pages.

(Continued)

*Primary Examiner* — Wesley Kim

(57) ABSTRACT

In one embodiment, a server may obtain source data for a communication session having a combined audio portion and non-audio portion. As such, the server may actively split the audio portion of the communication session from the non-audio portion of the communication session, and then provide the audio portion (to a first set of one or more phones) over a phone channel and the non-audio portion (to a second set of one or more phones) over a separate data channel. The second set of phones may then obtain and merge the audio portion from the phone channel and the non-audio portion from the data channel to reestablish the full communication session.

19 Claims, 5 Drawing Sheets

(56) References Cited

U.S. PATENT DOCUMENTS

| | | | |
|---|---|---|---|
| 7,239,338 | B2 | 7/2007 | Krisbergh et al. |
| 7,305,069 | B1 | 12/2007 | Day |
| 7,340,046 | B2 | 3/2008 | McClung et al. |
| 7,379,087 | B2 | 5/2008 | Yamatari et al. |
| 7,412,598 | B1 | 8/2008 | Gleichauf |
| 7,555,536 | B2 | 6/2009 | Dodrill et al. |
| 7,571,317 | B1 | 8/2009 | Vilhuber |
| 7,616,944 | B2 | 11/2009 | Gustavsson et al. |
| 7,653,925 | B2 * | 1/2010 | Hull et al. ............... 725/37 |
| 7,664,057 | B1 | 2/2010 | Wu et al. |
| 7,664,525 | B2 | 2/2010 | Matsumoto |
| 7,853,245 | B2 | 12/2010 | Yach et al. |
| 8,031,844 | B1 | 10/2011 | Ho et al. |
| 8,169,462 | B2 | 5/2012 | Ryu |
| 8,223,185 | B2 | 7/2012 | Gratton et al. |
| 8,265,247 | B2 | 9/2012 | Baccay |
| 8,325,213 | B2 | 12/2012 | Lamb et al. |
| 8,336,076 | B2 | 12/2012 | Oh et al. |
| 8,339,438 | B2 * | 12/2012 | Sylvain ............... 348/14.01 |
| 2004/0180689 | A1 * | 9/2004 | Nayak ............... 455/552.1 |
| 2005/0208962 | A1 | 9/2005 | Kim |
| 2007/0223444 | A1 | 9/2007 | Foo et al. |
| 2007/0276908 | A1 | 11/2007 | Asthana et al. |
| 2008/0037446 | A1 | 2/2008 | Zhou et al. |
| 2008/0253545 | A1 | 10/2008 | Gleichauf |
| 2008/0311879 | A1 | 12/2008 | Martin et al. |
| 2008/0318592 | A1 | 12/2008 | Mandalia |
| 2009/0323524 | A1 * | 12/2009 | Kuhn ............... 370/230 |
| 2010/0208030 | A1 | 8/2010 | Kim et al. |
| 2010/0215161 | A1 | 8/2010 | Baccay |
| 2011/0161487 | A1 | 6/2011 | O'Sullivan et al. |
| 2011/0164107 | A1 | 7/2011 | Tian et al. |
| 2011/0164735 | A1 | 7/2011 | Yuan et al. |

OTHER PUBLICATIONS

Cisco Systems, Inc., Cisco WebEx Meeting Center for iPhone Data Sheet, Internet Citation: http://static.webex.com/apple/Cisco_WebEx_iphone.pdf, Jan. 2009, 2 pages.

Ensor, J.R., et al., Control Issues in Multimedia Conferencing, Communications for Distributed Application and Systems Proceedings of the Conference on Communications Software, TRICOMM, NY, New York, IEEE, Apr. 1991, 11 pages.

IBM, System for Multicall Session Management, IP.com Journal, IP.com Inc., West Henrietta, NY, Jun. 2, 2006, 6 pages.

Liu, Feng, et al., An Approach of Integrating SIP in Converged Multimodal/Multimedia Communication Services, Computer Communications and Networks, Proceedings of the 12th International Conference, IEEE, Piscataway, NJ, Oct. 2003, 6 pages.

* cited by examiner

EFFICIENT TRANSMISSION OF AUDIO AND NON-AUDIO PORTIONS OF A COMMUNICATION SESSION FOR PHONES

CROSS REFERENCE TO RELATED APPLICATION

The present application is related to commonly owned, copending U.S. patent application Ser. No. 12/683,021, which is entitled EFFICIENT AND ON DEMAND CONVERGENCE OF AUDIO AND NON-AUDIO PORTIONS OF A COMMUNICATION SESSION FOR PHONES, filed by Yuan et al. on even date herewith.

TECHNICAL FIELD

The present disclosure relates generally to communications sessions transmitted over networks, and, more particularly, to the communication of audio and non-audio material with phones.

BACKGROUND

Audio, video, and data streams may be transmitted through a computer network is between a variety of devices. For instance, Voice over IP (VoIP), video over IP, images, text, etc., may all be forms of information travelling through the network between computers and phones (e.g., mobile phones and/or smartphones). Often, certain types of communication, such as online meetings, video, etc., have both an audio component and a "non-audio" component (e.g., video, data, etc.). Transmission of the audio and non-audio components for computers interconnected to the Internet may receive both components over a data (e.g. IP) network. Phones, however, generally have a different set of capabilities than online computers, such as limited data bandwidth and/or reduced processing ability.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a server may obtain is source data for a communication session having a combined audio portion and non-audio portion. As such, the server may actively split the audio portion of the communication session from the non-audio portion of the communication session, and then provide the audio portion (to a first set of one or more phones) over a phone channel and the non-audio portion (to a second set of one or more phones) over a separate data channel. The second set of phones may then obtain and merge the audio portion from the phone channel and the non-audio portion from the data channel to reestablish the full communication session.

DESCRIPTION

Figure 1:
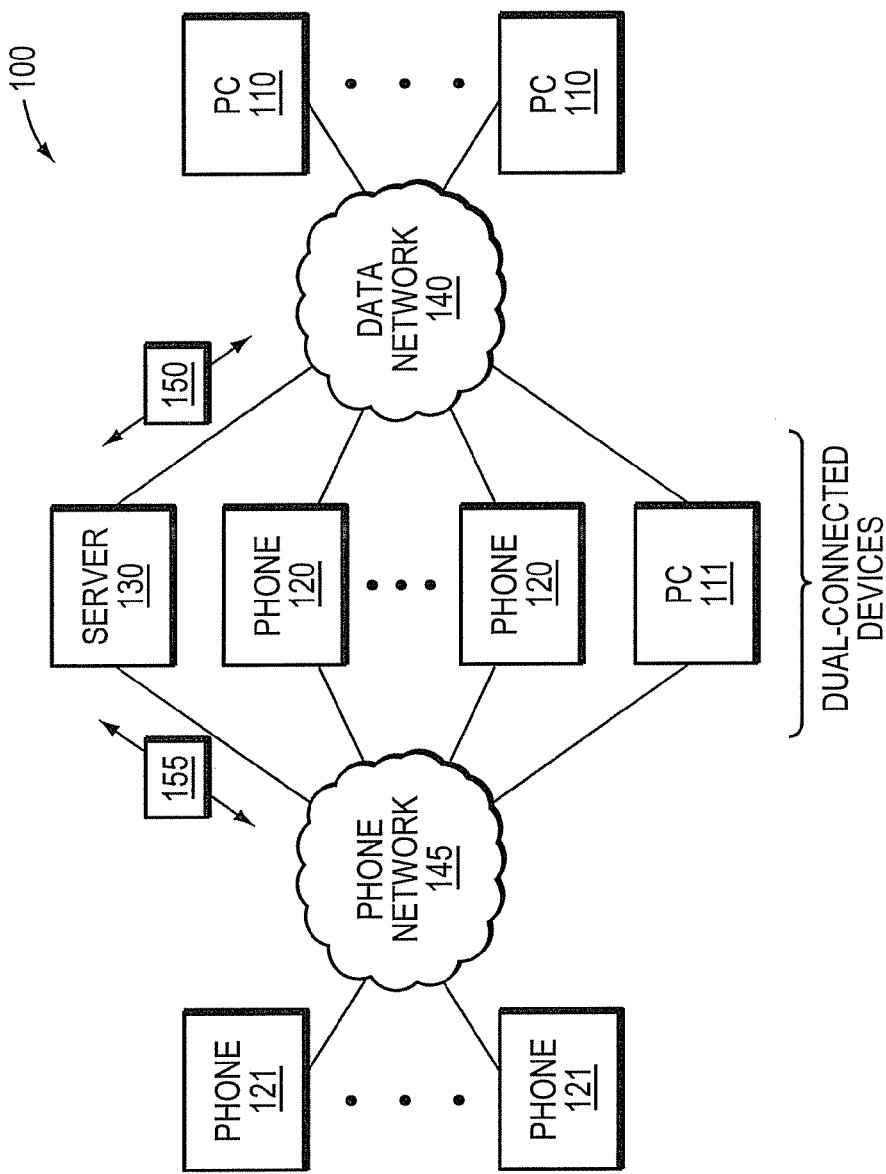
FIG. 1 illustrates an example phone network and data network.

FIG. 1 is a schematic block diagram of an example computer network 100 illustratively comprising nodes/devices, such as one or more participant/client devices, e.g., computers (personal computers or "PCs") 110/111 and phones 120/121 interconnected to an illustrative server 130 by links/networks as shown and as described further herein. For instance, participant devices may be interconnected with the server on a data network 140, such as the internet (e.g., IP network), and/or a phone network 145, such as a phone provider's land-based or mobile/cellular network. Illustratively, PCs 110 are interconnected with the server 130 only on the data network 140, while PC 111 is shown having dual-connectivity with the data network and phone network 145. Further, phones 120 are shown having dual-connectivity, while phone 121 is shown having only phone network connectivity. Data packets 150 may travel on the data network, while phone traffic 155 (e.g., audio signals) may travel on the phone network, such as according to various protocols. Those skilled in the art will understand that any number of nodes, devices, links, etc. may be used in the computer network, and that the view shown herein is for simplicity.

In this environment, a number of participants may interact in one or more communication sessions. Such a setting can be used for a meeting, training or education, support, or any other event that may require a number of participants to communicate, interact, collaborate, or otherwise participate, such as web conferences, online meetings, phone calls, video calls, etc. As used herein, a "session" describes a generally lasting communication between one or more participant devices through the server 130. Those skilled in the art will understand that the session may be implemented/established using protocols and services provided by various layers (e.g., application, session, and/or transport layers) of a network protocol stack according to the well-known OSI model.

In particular, each participant device may comprise an electronic device with capability for visual and/or auditory presentation. Thus, a participant device can be, for example, a desktop personal computer (PC), a laptop computer, a workstation, a personal digital assistant (PDA), a wireless telephone (e.g., cellular, mobile, etc.), a smart phone, an Internet television, and the like. Each participant device supports communication by a respective participant, in the form of suitable input device (e.g., keyboard, mouse, stylus, keypad, etc.) and output device (e.g., monitor, display, speech, voice, or other device supporting the presentation of audible/visual information). Each participant device may be interconnected with a suitable communications network such as, for example, the data network 140 and/or the phone network 145, as described herein. In one embodiment, each participant device may operate under the control of a suitable operating system to run software applications which may be installed, received, or downloaded. At least some of these software applications may support specific functions, such as, for example, functions related to the communication sessions.

The communication sessions, e.g., between the various participants, may be supported by a server 130. The server 130 may be a computer system that is connected to networks 140/145, and which may comprise and appear as one or more server computers thereon. Also, the server 130 may store information (e.g., content) which can be provided to the participant devices, such that the server is a source of the communication session (e.g., audio, video, presentations, etc.).

The data network 140 may comprise or be supported by one or more suitable communication networks to deliver content to the interconnected devices. The Internet is is an example data network that interconnects computer clients and servers located throughout the world and exchanges information according to Transmission Control Protocol/Internet Protocol (TCP/IP), Internetwork Packet eXchange/Sequence Packet eXchange (IPX/SPX), AppleTalk, or other suitable protocol. Other proprietary data networks may also be used, such as broadband access, cellular data networks, satellite data networks, and any other suitable transmission network designed to carry data.

Phone network 145 may be an analog, digital, or IP-based network that is designed and implemented by phone service providers to carry audio streams between audio devices, such as land-line phones and mobile phones. A cellular telephone network is one example phone network 145, as is a satellite telephone network or the conventional land-line based public switched telephone network ("PSTN," aka the "plain old telephone system" or "POTS").

Those skilled in the art will appreciate that data can be transmitted on phone networks, and that phone calls may be carried on a data network, but for the purpose of discussion herein, a "phone network 145" carries audio/phone calls on a phone channel, while a "data network 140" carries non-audio data on a separate data channel. That is, both the phone channel and data channel may, in certain situations, use the same underlying physical technology, such as the same IP network for portions of the transmission, but phone/audio sessions and data/non-audio sessions may be carried in different streams across the networks, and may be treated differently along the way.

Figure 2:
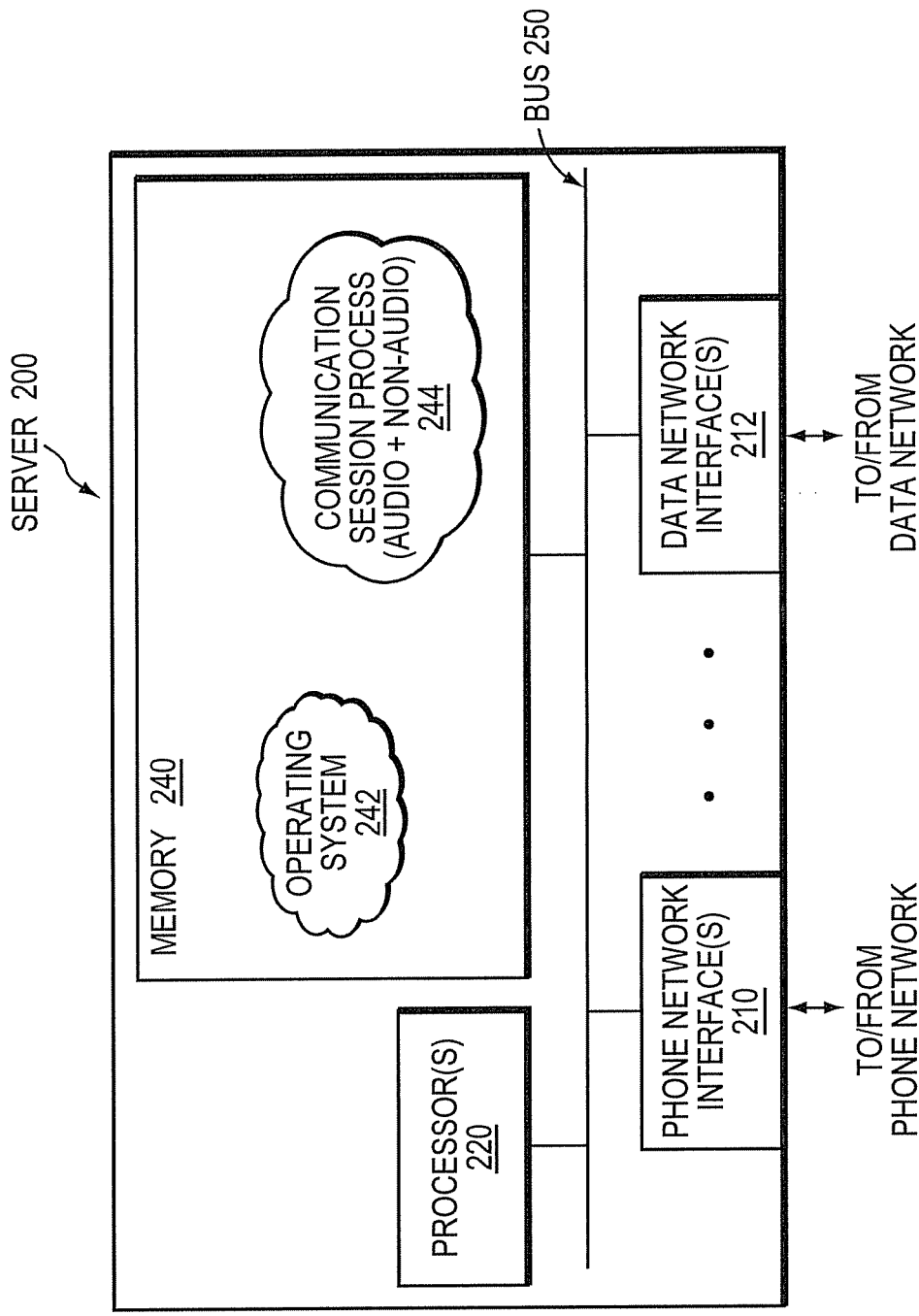
FIG. 2 illustrates an example server.

FIG. 2 illustrates a schematic block diagram of an example server 200 (130) that may be used with one or more embodiments described herein, e.g., for communication sessions. Illustratively, server 200 may be implemented or incorporated in any suitable computing device operating under the control of any suitable operating system. In particular, the device 200 comprises one or more phone network interfaces 210 and one or more data network interfaces 212, at least one processor 220, and at least one memory 240 interconnected by a system bus 250.

Note that while the illustrative embodiment described shows a single server, a collection of servers (e.g., localized and/or distributed) may also operate to perform the is functions described herein. For example, "server 200" (or "130") may comprise a separate server for communication on each of the types of networks (e.g., a web server and a telephony server), for each type of action (e.g., splitting streams as described herein, etc.), and so on, where the servers communicate with each other to produce the end result (i.e., in this instance, the communication session operating as described herein). Thus, "server 200" may comprise, either as a single server or as a collection of servers, one or more memories, one or more processors, one or more network interfaces (e.g., adapted to communicate traffic for a communication session), etc., as may be appreciated by those skilled in the art.

The network interfaces 210/212 contain the mechanical, electrical, and signaling circuitry for communicating data over physical/wireless links coupled to the networks 145/140. The network interface(s) may be configured to transmit and/or receive data using a variety of different communication protocols suitable for the corresponding network.

The memory 240 comprises a plurality of storage locations that are addressable by the processor 220 and the network interfaces 210/212 for storing software programs associated with the embodiments described herein. The processor 220 may comprise necessary elements or logic adapted to execute the software programs and manipulate the data structures. An operating system 242, portions of which are typically resident in memory 240 and executed by the processor, functionally organizes the device by, inter alia, invoking operations in support of software processes and/or services executing on the server. In particular, these software processes and/or services may illustratively comprise a communication session process 244, which may contain computer executable instructions executed by the processor 220 to generally perform functions to manage or control various processes or aspects during the course of a communication session as described herein. It will be apparent to those skilled in the art that other types of processors and memory, including various computer-readable media, may be used to store and execute program instructions pertaining to the techniques described herein.

In addition, according to one or more embodiments described herein, a communication session, such as an online collaborative computing session, a video call, etc., may comprise one or more "sub-sessions," such as a different sub-session for various components or features of the session itself. For instance, these sub-sessions may comprise, e.g., voice, data, desktop sharing, document sharing (portable document), video, chat, file transfer, remote access, etc. Communication between participants may thus be achieved with one or more of the above sub-sessions enabled. For example, if a chat sub-session is enabled then an attendee can send a chat message to one or more other attendees while with desktop sharing sub-session enabled the presenter can share his/her desktop with all attendees, etc. These sub-sessions are specific to the type of communication session, and are also specific to the type of device participating in the communication session (e.g., a phone without video capability is unable to participate in a video sub-session). As described herein, these sub-sessions may be distinguished as either audio sessions or non-audio sessions (or as audio or non-audio portions of a communication session).

Figure 3:
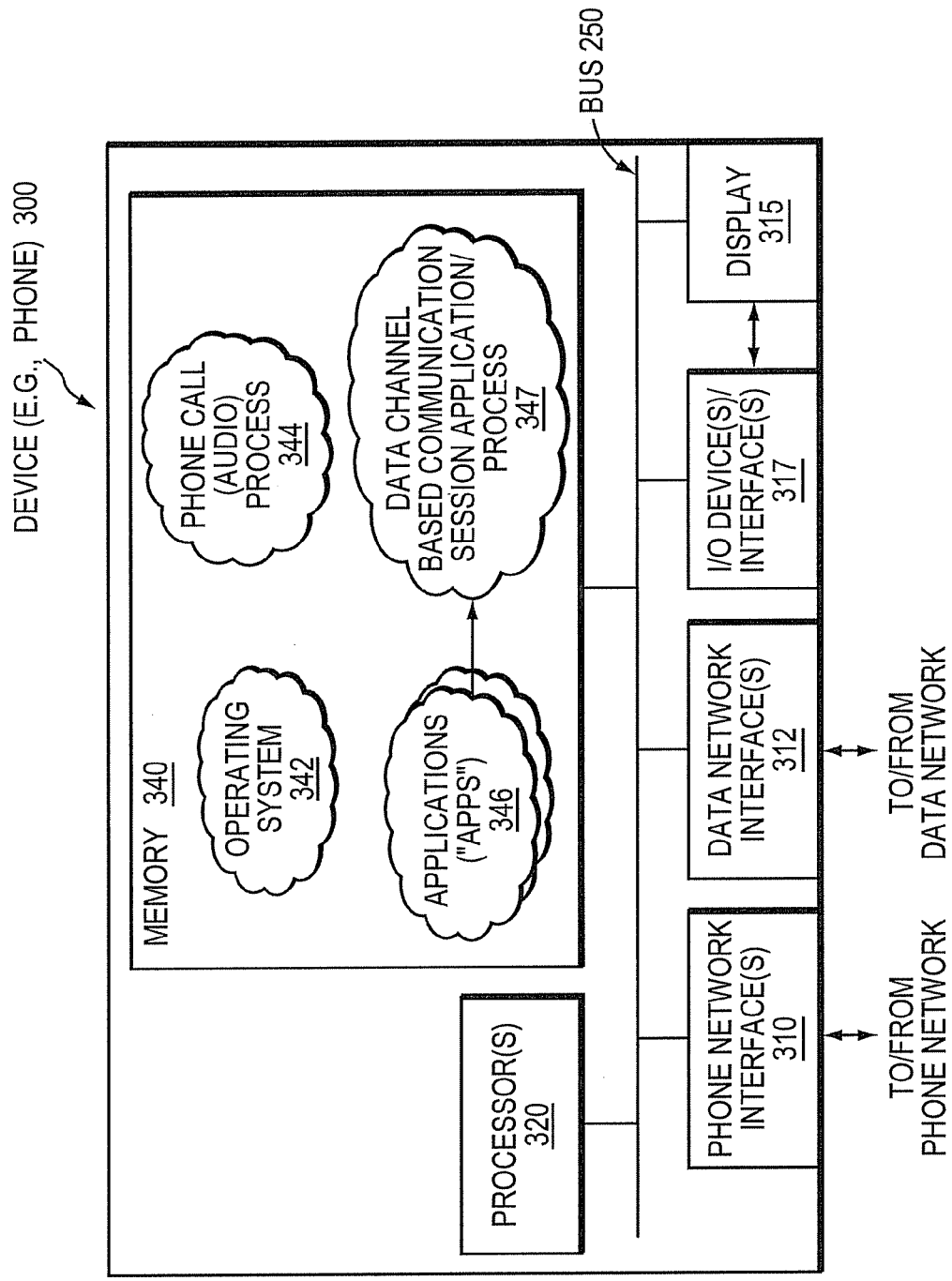
FIG. 3 illustrates an example phone/device.

FIG. 3 illustrates a schematic block diagram of an example device 300 that may be used with one or more embodiments described herein, such as a phone 120/121 or PC 110/111. Illustratively, device 300 may be implemented or incorporated in any suitable computer such as, for example, a PC, laptop, workstation, personal digital assistant (PDA), smart phone, mainframe, file server, workstation, or other suitable data processing facility supported by storage (either internal, e.g., electronic memory, or external, e.g., magnetic/optical disk), and operating under the control of any suitable operating system.

In particular, the device 300 may comprise one or more phone network interfaces 310 and one or more data network interfaces 312, a display 315 and one or more other input/output (I/O) interfaces 317, a processor 320, and a memory 340 interconnected by a system bus 350. Network interfaces 310 and 312 are configured to communicate over the respective networks, as mentioned above. Note that a device with both types of network interfaces is considered a "dual-connected" device, while a device with only a single type of interface is considered a "singly-connected" device. I/O interfaces 317 contain the mechanical, electrical, and signaling circuitry for communicating with one or more user interface devices in addition to the display (monitor/screen) 315, such as a mouse, keyboard, keypad, microphone, etc. Note that the display 315 may also function as an input device, such as touch-screen capabilities (e.g., where the keypad is displayed on the touch-screen).

The memory 340 comprises a plurality of storage locations that are addressable by the processor 320 and the network interfaces 310/312 for storing software programs associated with the embodiments described herein. An operating system 342, portions of which are typically resident in memory 340 and executed by the processor, functionally organizes the device by, inter alia, invoking operations in support of software processes and/or services executing on the device (e.g., for communication sessions). In particular, these software processes and/or services may comprise a phone call process 344 (for phone network attached devices) and one or more applications 346, such as an illustrative data channel based communication session application/process 347 (for data network attached devices) and other applications or "apps" (e.g., email, web browsers, schedule management applications, games, etc.).

The phone call process 344 may be specifically configured to participate in phone calls, such as in accordance with conventional phone operation. That is, the phone call process (or simply, "phone process") 344 is generally configured to receive and transmit audio signals over the phone network 145. Conversely, the data channel based communication session application 347 (or simply, "application 347") may contain computer executable instructions executed by the processor 220 to generally perform functions to manage or control various processes or aspects during the course of a communication session other than phone calls (audio sessions). For instance, application 347 may comprise necessary programming to participate in an online collaborative computing session (e.g., online meetings), video calls, presentations, emails, text messages, etc., and may operate as described herein.

As noted above, certain types of communication, such as online meetings, video, etc., often have both an audio component and a non-audio component (e.g., video, data, etc.). Transmission of the audio and non-audio components for computers interconnected to the Internet may receive both components over a data (e.g. IP) network. Phones, however, generally have a different set of capabilities than online computers, such as limited data bandwidth and/or reduced processing ability. Based on the functionalities and features of certain phones currently available, it may be difficult, inefficient, or impossible to participate in a full communication session that has both and audio and non-audio component.

In accordance with one or more embodiments herein, the audio component of a communication session may first be split from the other non-audio components, and then the audio component may be provided (e.g., transmitted) over the phone network 145 while providing (transmitting) the non-audio components over the data/computer (e.g., IP) network 140. Illustratively, the server-based techniques described herein may be performed by (or in conjunction with) communication session process 244, which contains computer executable instructions to perform the associated techniques.

In particular, as mentioned above, phone provider networks 145 are generally designed to carry audio streams between phones on a higher priority audio/phone channel, while non-audio (e.g., data) streams are passed on a lower priority data channel (data networks 140), as compared to each other. Accordingly, when participating in a video call or online meeting with data (images, information, content, etc.), the audio portion is generally considered to be more important and should remain uninterrupted. Conversely, images, streaming video, data files, documents, roster lists, chat sessions, executable files, etc., may thus be sent over the lower priority (and sometimes less reliable) data channel, as it is not as critical. For instance, a user on a video call may wish to have the audio conversation continue, despite not being able to see the associated video. Alternatively, a phone user may not have video capability on his or her phone, but may still desire to participate in a video call's audio portion.

Figure 4:
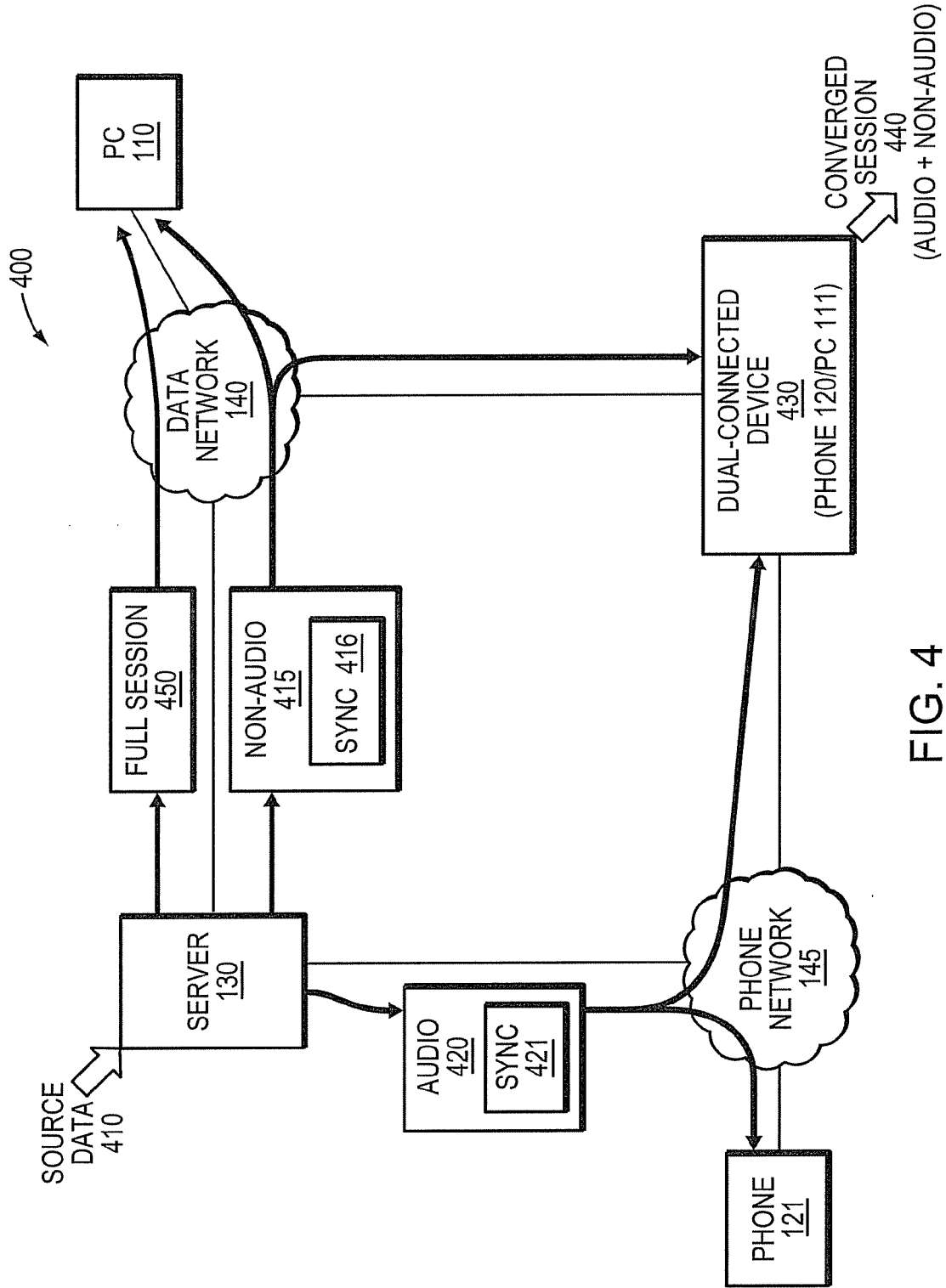
FIG. 4 illustrates an example split communication session over a phone/data network.

FIG. 4 illustrates an example network (e.g., an alternative view of network 100 in FIG. 1), where a server 130 may obtain (e.g., receive) source data 410, such as audio and images/data, from another device in the network or from within its own storage (e.g., memory 240). Note that the source data may originally be arranged as a combined audio and non-audio source, or the server may receive separate audio and non-audio streams. In the event the communication session is combined, the server may split the audio and images/data portions from each other. For instance, the server may receive separate streams for audio and non-audio data, such as a separate data (IP) stream for audio and a separate data (IP) stream for non-audio data. Alternatively, according to the techniques herein, the audio may be sent separated to the server over a phone channel, with the non-audio data may be sent over a data channel. These separate streams may then be converted into the appropriate transmission mediums as described herein, e.g., combined for full session transmission (450), converted to data packets, or converted to phone network transmission (e.g., phone line audio signals). Conversely, the server may receive a combined communication session (e.g., as an IP data stream), and may process the combined session in order to determine the audio output and thus separate the audio output from the remaining non-audio portion, accordingly.

Depending on device configuration (e.g., PCs vs. mobile phones), the audio portion and images/data ("non-audio") portion may be transmitted over the data network simultaneously (unsplit) as a full session 450, or the audio may be transmitted over the phone network 145 as a separate audio portion 420 (audio signals 155) while images and other data may be transmitted separately over the data (e.g., IP) network 140 as non-audio portion 415 (e.g., data packets 150). Specifically, the server 130 may maintain a database of device types and capabilities, such as according to registered user profiles, and may determine whether to send a combined audio and non-audio data stream 450, or one or both of the separate audio or non-audio portions.

PCs 110 that are not connected to the phone network 145 may receive the full session 450 as a single stream from the server 130, and phones 121 that are not connected to the data network 140 may receive only the audio portion 420. Any dual-connected device, such as phones 120 and PCs 111, however, may operate in accordance with one or more embodiments herein to merge the audio portion from the phone channel and the is non-audio portion from the data channel into converged session 440, as described herein. Note that phone/audio devices may simply receive the split-off audio portion, and not any images/data, as desired, and as also described below.

This technique may be applied to asynchronous audio/data streams, such as online meetings where the images (e.g., slides) and audio may have slightly offset timing. However, it may also be applied to synchronous audio/data streams, such as splitting video over IP into audio and images, which may be remerged at the receiving device. Synchronization may be accomplished through certain synchronization signaling transmitted via both channels, e.g., timing signals on the audio channel (preferably inaudible signals) and on the data channel. For instance, the server 130 may establish (or determine, if included in a previously split session) synchronization signals for the phone channel and data channel for use with merging the two portions (sub-sessions) by the dual-connected devices 430. Upon obtaining (receiving) the signals, the devices 430 may play and display the corresponding audio and video/images in a manner that synchronizes the two portions according to the synchronization signals.

Alternatively, synchronization may be merely roughly estimated, such as transmitting the separate streams at the same time or accounting for delay measurements or estimations to attempt to have the audio and non-audio portions reach the dual-connected devices 430 at approximately the same time. Said differently, the non-audio portion of the communication session may be synchronized with the audio portion of the communication session based on estimated delays associated with the data channel and the phone channel, respectively. The delay may be illustratively calculated by using echo messages (e.g., "pings"), delay measurement protocols, or based on general statistics of network characteristics (e.g., studies that show one type of network is generally X milliseconds, or X% faster or slower than the other type of network).

According to the techniques above, then, the audio component of a data stream (communication session) may be split from any non-audio component(s), and the audio component may be sent over the phone network, while non-audio components may be sent over the data (IP) network, and merged at the mobile device. This technique may be is used (e.g., particularly for transmission over 3 G mobile networks) for online collaborative computing sessions, video calls, video over IP, etc., where the audio uses the conventional phone network, and the video uses the data network.

Since the audio and non-audio (data) portions of an online meeting may be distributed over separate channels (the phone network and the data/IP network, respectively), one or more embodiments described herein may also be used to provide a way to converge the audio and non-audio parts of a communication session (e.g., meeting, call, etc.) efficiently. That is, the phones (or dual-attached devices, generally) may be configured to play the audio that is received from the phone channel 145 over a speaker (I/O device 317) and display the non-audio data (e.g., images, video, etc.) received from the data channel 140 on display 315. Note that certain non-audio data may be processed prior to display, such as through decompression, decryption, execution, etc. Thus, "display" may generally imply processing and displaying herein.

According to one or more embodiments herein, therefore, the data channel based communication session application 347 may execute on the phone in order to participate in a full communication session on the phone. In particular, the application 347 may be used in order to participate in a non-audio portion of the communication session on the data channel with the server in a manner as described herein, while the phone call process participates in the audio portion of the communication session on the phone channel. As an example, for an online meeting, the user may thus hear (and contribute to) the audio portion over the high priority phone network 145, while data such as slides, images, etc., may be received over the lower priority data network 140 and processed by the application 347 to provide the user with a fully converged communication session. As another example, the audio portion of a video call may be transmitted over the phone network, while the video portion may be transmitted over the data network. In this example, the audio portion should continue to function on the higher priority phone channel in the event the lower priority video portion is delayed or lost for various reasons. Other examples, such as online television, radio with associated data, etc., may also be used. Notably, as mentioned above, the audio and non-audio portions ("streams") may be asynchronous (e.g., for online meetings) or synchronous (e.g., for video calls), where the non-audio portion of the communication session is synchronized with the audio portion of the communication session. Accordingly, the phones 120 may be configured to synchronize the portions, where appropriate, in order to enhance user experience.

In one or more embodiments, the phone user need not participate in the non-audio portion of the meeting/call in direct response to participating in the audio portion. For instance, the user may be prompted to participate (e.g., accept participation) in the non-audio portion, or the user may simply not activate the application 347 necessary to participate in the non-audio portion. If the user desires to participate in the non-audio portion at a later time, then he or she may activate the application 347 (if the user's phone is capable of doing so), thus initializing the reception of the non-audio portion of the communication session in parallel with the audio portion already in progress.

Note further that the audio portion or the non-audio portion may be separately stopped at the phone by ending the call or terminating the application 347. Alternatively, once either the call or application 347 is stopped, the entire communication session may be configured to cease. Thus, in this situation, termination of either the call or application 347 causes resultant termination of the application or call, respectively.

The techniques described herein may thus be used to allow for efficient transmission of split audio and non-audio components of a communication session over a phone channel and data channel, respectively. The techniques above may also be used to allow for efficient and user-friendly merging of the separate portions at dual-attached devices (e.g., mobile phones). As mentioned, the one or more embodiments above may apply to online meetings or video calls (e.g., video over IP), where the application 347 may be used to display the associated content (e.g., images) received over the data network 140, while audio is received over the phone network 145. Accordingly, sources of data ("source data") may comprise, among other things, online collaborative computing sessions, online meetings, videos, video calls, video over IP, etc.

Figure 5:
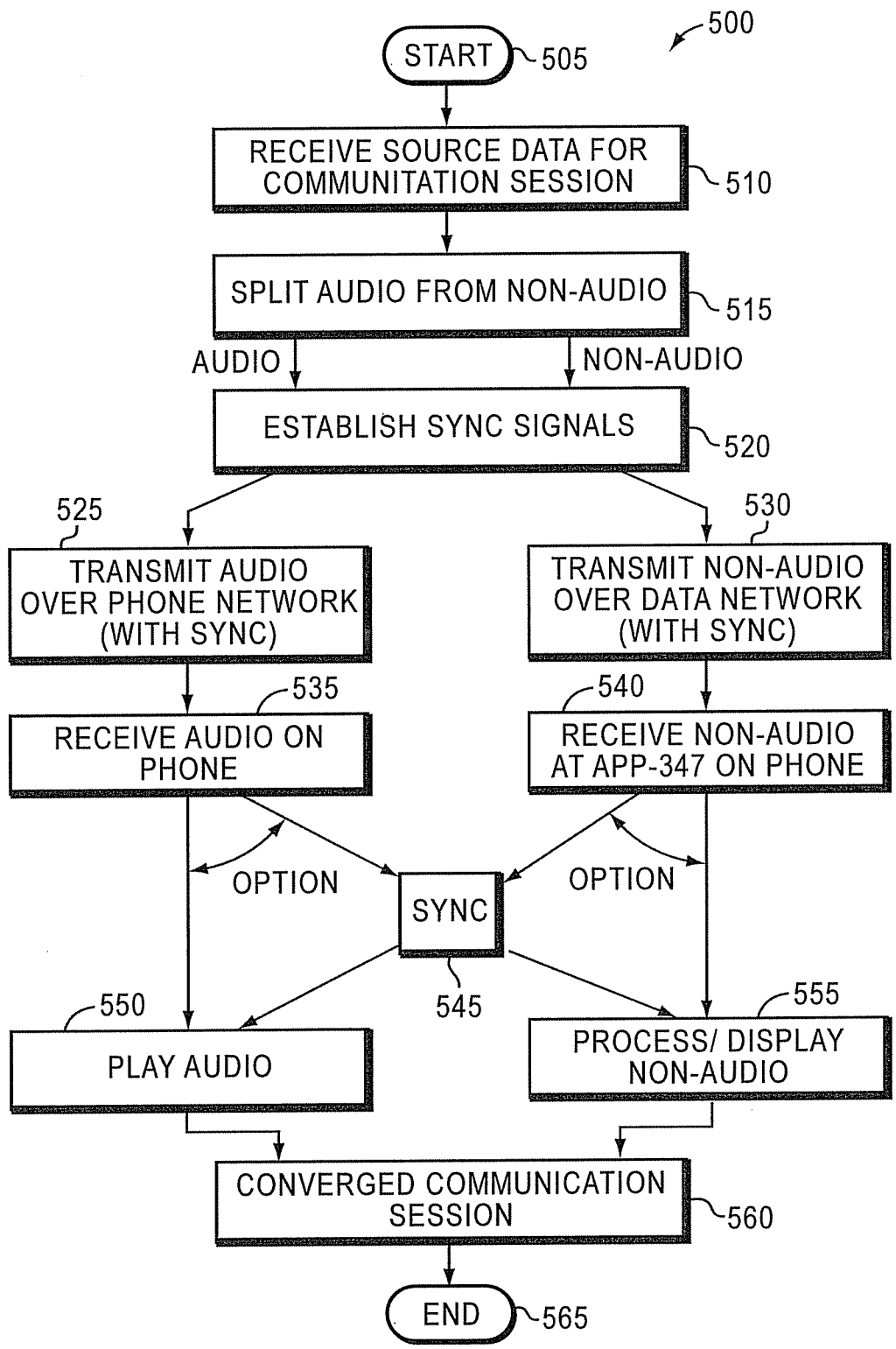
FIG. 5 illustrates an example procedure for splitting and merging audio from non-audio portions of a communication session.

FIG. 5 illustrates an example procedure for splitting and merging audio from non-audio portions of a communication session in accordance with one or more embodiments is described herein. The procedure 500 starts at step 505, and continues to step 510, where source data 410 may be received (or stored) at the server 130 for the communication session. The server may then split the audio portion 420 from the non-audio portion 415 in step 515, and then may optionally (e.g., for synchronized sessions) establish corresponding synchronization signals (421/416) in step 520. The two separated portions may then be transmitted on their respective channels/networks, such as the audio portion over the phone network in step 525 (e.g., with optional synchronization signal) and the non-audio portion over the data/IP network in step 530 (e.g., also with optional synchronization signal).

In steps 535 and 540, a dual-connected device 430 (e.g., phone 120) receives the audio portion and non-audio portion of the communication session. Optionally, the portions may then be synchronized in step 545. The audio portion may be "played" on a speaker (I/O 317) in step 550, such as participating in a phone call, while the non-audio portion may be processed/displayed by the associated application 347 in step 555, such as showing images on display 315. The result of the simultaneous audio and non-audio output is the converged communication session in step 560. The procedure ends in step 565, for example, in response to ending the communication session.

Advantageously, the novel techniques described herein efficiently split and converge audio and non-audio portions of a communication session with phones on a phone channel and a data channel. In particular, the techniques described above allow audio components of a session to utilize phone networks that are designed for audio transmission and have high priority over data, while reducing bandwidth from within data/IP network by only (and optionally) sending non-audio components over the data/IP network. The dual-connected devices (e.g., phones) may then converge the audio and non-audio portions to establish a full communication session.

While there have been shown and described illustrative embodiments that efficiently split and converge audio and non-audio portions of a communication session, it is to be understood that various other adaptations and modifications may be made within the spirit and scope of the embodiments herein. For example, the embodiments have been shown and described herein using mobile phones interconnected to a phone network (channel) and a data network (channel). However, the embodiments in their broader sense are not so limited, and may, in fact, be used with any device interconnected to a phone network and data network, such as desktop phones, computers (e.g., with a modem and internet interface), etc.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   obtaining, at a server which manages communication sessions, source data for a communication session, the source data having an audio portion and a non-audio portion;
   determining if the audio portion and non-audio portion are merged;
   splitting, at the server, in response to determining that the audio portion and non-audio portion are merged, the audio portion from the non-audio portion;
   determining, at the server, if a first set and a second set of one or more recipient devices are connected to a data channel and a phone channel;
   providing, in response to determining that the first set and the second set of one or more recipient devices are connected to the phone channel, the audio portion of the communication session from the server to the first and the second set of one or more recipient devices over the phone channel; and
   providing, in response to determining that the second set of one or more recipient devices is connected to the data channel, and determining that the first set of one or more recipient devices is not connected to the data channel, the non-audio portion of the communication session from the server to the second set of recipient devices over the data channel, wherein the second set of one or more recipient devices is configured to merge the audio portion from the phone channel and the non-audio portion from the data channel.

2. The method as in claim 1, wherein the audio portion of the communication session on the phone channel is transmitted at a higher priority than the non-audio portion of the communication session on the data channel.

3. The method as in claim 1, further comprising:
   establishing a first synchronization signal and a second synchronization signal for the phone channel and data channel respectively, the first and second synchronization signals for merging the audio portion of the communication session and non-audio portion of the communication session;
   providing the first synchronization signal on the phone channel from the server to the second set of one or more recipient devices; and
   providing the second synchronization signal on the data channel from the server to the second set of one or more recipient devices.

4. The method as in claim 1, further comprising:
   synchronizing the non-audio portion of the communication session with the audio portion of the communication session based on estimated delays associated with the data channel and the phone channel, respectively.

5. The method as in claim 1, further comprising:
   prompting for acceptance of participation in the non-audio portion of the communication session; and
   obtaining the acceptance of participation in the non-audio portion of the communication session.

6. The method as in claim 1, wherein the source data for the communication session is selected from a group consisting of: an online collaborative computing session; an online meeting; a video; a video call; and a video over internet protocol call.

7. The method of claim 1, further comprising:
   providing, in response to determining that the second set of one or more recipient devices is not connected to the phone channel, and is connected to the data channel, the audio portion of the communication session from the server to the second set of one or more recipient devices over the data channel.

8. The method of claim 1, wherein providing the non-audio portion on the data channel further comprises:
   prompting a user to participate in the non-audio portion;
   delaying, in response to an indication received from the recipient, providing the non-audio portion on the data channel.

9. An apparatus, comprising:
   a server which manages communication sessions;
   a processor configured to execute one or more processes on the server; and
   a memory configured to store a process, the process when executed operable to:
   obtain source data for a communication session, the source data having an audio portion and non-audio portion;
   determine if the audio portion and non-audio portion are merged;
   split, at the server, in response to determining that the audio portion and non-audio portion are merged, the audio portion from the non-audio portion;
   determine, at the server, if a first set and a second set of one or more recipient devices are connected to a data channel and a phone channel;
   provide, in response to determining that the first set and the second set of one or more recipient devices are connected to the phone channel, the audio portion of the communication session to the first and the second set of one or more recipient devices over the phone channel; and provide, in response to determining that the second set of one or more recipient devices is connected to the data channel, and determining that the first set of one or more recipient devices is not connected to the data channel, the non-audio portion of the communication session to the second set of recipient devices over the data channel, wherein the second set of one or more recipient devices is configured to merge the audio portion from the phone channel and the non-audio portion from the data channel.

10. The apparatus as in claim 9, wherein the process when executed is further operable to:

establish a first synchronization signal and a second synchronization signal for the phone channel and data channel respectively, the synchronization signals for merging the audio portion of the communication session and non-audio portion of the communication session;

provide the first synchronization signal on the phone channel to the second set of one or more recipient devices; and provide the second synchronization signal on the data channel to the second set of one or more recipient devices.

11. The apparatus as in claim 9, wherein the source data for the communication session is selected from a group consisting of: an online collaborative computing session; an online meeting; a video; a video call; and a video over internet protocol call.

12. The apparatus of claim 9, wherein the process when executed is further operable to:

provide, in response to determining that the second set of one or more recipient devices is not connected to the phone channel, and is connected to the data channel, the audio portion of the communication session from the server to the second set of one or more recipient devices over the data channel.

13. The apparatus of claim 9, wherein the process when executed is further operable to:

prompt a user to participate in the non-audio portion;

delay, in response to an indication received from the recipient, providing the non-audio portion on the data channel.

14. A non-transitory computer-readable storage media on a server encoded with software comprising computer executable instructions and when the software is executed operable to:

obtain source data for a communication session, the source data having an audio portion and non-audio portion;

determine if the audio portion and non-audio portion are merged;

split, at the server, in response to determining that the audio portion and non-audio portion are merged, the audio portion of the communication session from the non-audio portion of the communication session;

determine, at the server, if a first set and a second set of one or more recipient devices are connected to a data channel and a phone channel;

provide, in response to determining that the first set and the second set of one or more recipient devices are connected to the phone channel, the audio portion of the communication session to the first and second set of one or more phones recipient devices over the phone channel; and provide, in response to determining that the second set of one or more recipient devices is connected to the data channel, and determining that the first set of one or more recipient devices is not connected to the data channel, the non-audio portion of the communication session to the second set of phones recipient devices over the data channel, wherein the second set of one or more phones recipient devices is configured to merge the audio portion from the phone channel and the non-audio portion from the data channel.

15. The computer-readable storage media of claim 14, further comprising instructions operable to transmit the audio portion of the communication session on the phone channel at a higher priority than the non-audio portion of the communication session on the data channel.

16. The computer-readable storage media of claim 14, further comprising instructions operable to:

establish a first synchronization signal and a second synchronization signal for the phone channel and data channel respectively, the synchronization signals for merging the audio portion of the communication session and non-audio portion of the communication session;

provide the first synchronization signal on the phone channel from the server to the second set of one or more recipient devices; and provide the second synchronization signal on the data channel from the server to the second set of one or more recipient devices.

17. The computer-readable storage media of claim 14, further comprising instructions operable to:

prompting for acceptance of participation in the non-audio portion of the communication session;

obtaining the acceptance of participation in the non-audio portion of the communication session.

18. The computer-readable storage media of claim 14, further comprising instructions operable to:

provide, in response to determining that the second set of one or more recipient devices is not connected to the phone channel, and is connected to the data channel, the audio portion of the communication session from the server to the second set of one or more recipient devices over the data channel.

19. The computer-readable storage media of claim 14, further comprising instructions operable to:

prompt a user to participate in the non-audio portion;

delay, in response to an indication received from the recipient, providing the non-audio portion on the data channel.

* * * * *